ously kill insects like flies, mites, aphids, etc. They

2,962,517

PHOSPHONIC ACID ESTER FLUORIDES AND A PROCESS FOR THEIR MANUFACTURE

Hans-Joachim Tuppack, Leverkusen, and Gerhard Schrader, Wuppertal-Cronenberg, Germany, assignors to Farbenfabriken Bayer Aktiengesellschaft, Leverkusen, Germany, a corporation of Germany No Drawing. Filed May 28, 1958, Ser. No. 738,295

Claims priority, application Germany June 3, 1957

14 Claims. (Cl. 260—461)

The present invention relates to and has as its objects new and useful insecticides. Generally these compounds may be represented by the following formula

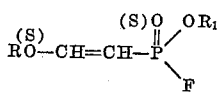

wherein R stands for alkyl especially lower alkyl radicals, and $R_1$ stands for alkyl radicals up to 6 carbon atoms and mono-chloro-substitution products thereof.

Vinyl ethers or mercaptans are known to add on to phosphorus pentachloride. These adducts may then be reduced in known manner with sulfurous acid to form the corresponding β-alkoxy- or alkylmercapto-vinyl-phosphonic acid dichlorides:

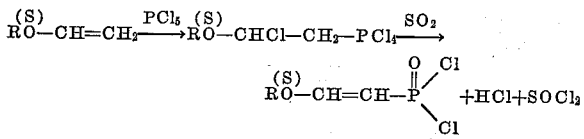

The above shown adducts of phosphorus pentachloride and β-alkoxy- or β-alkylmercapto-vinyl-ethers may also be reduced with hydrogen sulfide so as to form β-alkoxy- or β-alkylmercapto-vinyl thionophosphonic acid dichlorides:

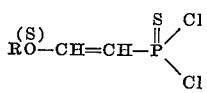

It has been found that these β-alkoxy- or -alkylmercapto-vinyl-phosphonic- or -thionophosphonic acid dichlorides may be converted with alkali metal fluorides in the presence of any alcohol into the above shown hitherto unknown β-alkoxy- or -alkylmercapto-vinyl-phosphonic- or thionophosphonic acid ester fluorides of the above formula.

The reaction is expediently carried out in the presence of an inert solvent at temperatures of between 65 and 80° C. Particularly useful solvents are benzene, toluene and chlorobenzene. The alkali metal fluoride should be finely divided and free of water.

The new compounds of the present invention very effectively kill insects like flies, mites, aphids, etc. They distinguish themselves especially by a good contact-insecticidal activity and at the same time by an activity on eating insects such as caterpillars. Most surprisingly they are of remarkable low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with a commercial emulsifier), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

The insecticidal activity of the inventive compounds may be seen from the following test results.

Aqueous dilutions of the following compounds

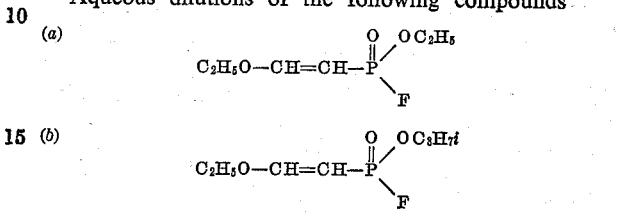

have been prepared by mixing the active ingredient with the same amount of dimethyl formamide as an auxiliary solvent, adding thereafter 20% by weight referred to active ingredient of a commercial emulsifier consisting of a benzyl hydroxy polyglycol ether containing about 10 to 15 glycol residues, and diluting at last this premixture with water to the desired concentration indicated in the following paragraphs. The tests have been carried out in the following manner:

Against flies of the type *Musca domestica* (with compounds (*a*) and (*b*)). About 50 flies were placed under covered Petri dishes in which drip wet filter paper has been placed which is sprayed with an insecticidal solution as prepared above. The living status of the flies has been determined after 24 hours; solutions of 0.001% kill flies 100%;

Against aphids of the type *Doralis fabae* (contact-insecticidal action) (with compounds (*b*)). Heavily infested bean plants (*Vitia faba*) have been sprayed drip wet with solutions as prepared above. The effect has been determined by evaluation after 24 hours by counting the dead pests either on the surface of the soil or still remaining on the plants; solutions of 0.01% kill aphids 100%.

Further activities of the inventive compounds are to be found in the following examples, which are given by way of illustration only without, however, limiting the present invention thereto:

Example 1

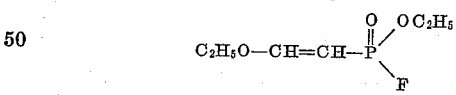

85 grams of finely divided anhydrous sodium fluoride are dissolved in 200 millilitres of toluene. While stirring there are added 20 grams of absolute ethyl ethanol. At 80° C. there are added while stirring 76 grams of β-ethoxy vinyl phosphonic acid dichloride (B.P. 1 mm./ 85°). The temperature is kept for 1 hour at 80 to 90° C. and the reaction mixture then is allowed to cool down. From impurities and precipitated salts the mixture is filtered with suction and the filtrate then is freed from solvents by filtration in vacuum. The residual β-ethoxy vinyl phosphonic acid ethyl ester fluoride is distilled under 0.01 mm./70° C. and there are obtained 45 grams (55% of the theoretically) of the new ester which is a pale water-insoluble oil. Toxicity on rats per os $LD_{50}$ 25 mg./kg. Flies are killed completely with solutions of 0.001%, caterpillars are killed completely with solutions of 0.1%. Systemic action on aphids with solutions of 0.1%=100%.

By exactly the same way but using instead of β-ethoxy vinyl phosphonic acid dichloride the equimolecular amount of β-ethoxy vinyl thiophosphonic acid dichloride there is obtained the ester of the following formula

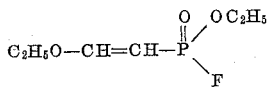

Example 2

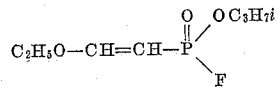

85 grams of sodium fluoride are suspended in 200 millilitres of toluene. There are added while stirring 25 grams of isopropanol and 1 drop of water. 76 grams of β-ethoxy vinyl phosphonic acid dichloride are added dropwise with vigorous stirring at 80° C. The reaction is exothermic. When the reaction has subsided, the product is warmed to 90° C. for a further hour, then cooled to room temperature and the filtrate is fractionated. 40 grams of β-ethoxy vinyl fluorophosphonic acid isopropyl ester of B.P. 74° C./0.01 mm. Hg are thus obtained. Yield 50% of the theoretical. The new ester is a colorless water-insoluble oil which shows a mean toxicity on rats per os of 25 milligrams per kilogram. Solutions of 0.01% kill grain weevils, Colorado beetles and aphids 100%. Flies are killed completely with solutions of 0.001%, and caterpillars are killed completely with 0.1% solutions. Systemic action on aphids with solutions of 0.1%=100%.

By exactly the same way but using instead of β-ethoxy-vinyl phosphonic acid dichloride the equimolecular amount of β-ethyl mercapto vinyl thiophosphonic acid there is obtained the ester of the following formula

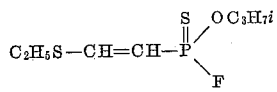

Example 3

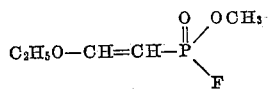

210 grams of sodium fluoride are suspended in 500 millilitres of benzene and 32 grams of methanol are added with stirring. 190 grams of β-ethoxyvinyl phosphonic acid dichloride are then added dropwise thereto at 65° C. and the mixture is kept at 65° C. for a further hour. After filtering off with suction from the salts, the product is distilled. The new ester has a B.P. 80–81° C./1 mm. Hg. Yield: 52 grams. The β-ethoxyvinyl fluorophosphonic acid methylester is a pale yellow water-insoluble oil. Yield: 30% of the theoretical. The new ester has a toxicity on rats per os of 250 mg./kg. Grain weevils and aphids are killed completely with solutions of 0.01%. Caterpillars are killed completely with solutions of 0.1%.

By the same way but using instead of β-ethoxy vinyl phosphonic acid dichloride the equimolecular amount of β-ethyl mercapto vinyl phosphonic acid dichloride there is obtained the ester of the following formula

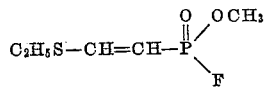

Example 4

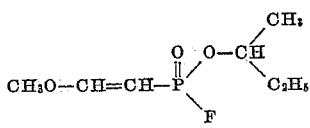

85 grams of sodium fluoride are suspended in 200 millilitres of toluene. To this solution there are added 30 grams of secondary butyl alcohol. Then there are added at 80° C. while stirring 70 grams of β-methoxy vinyl phosphonic acid dichloride. The temperature is kept for 1 further hour at 90° C., cooled down to room temperature and then the salts are filtered off. While fractionation of the filtrate there are obtained 70 grams of the new ester fluoride of B.P. 0.01 mm./80° C. Yield: 81% of the theoretical. Toxicity on rats per os $LD_{50}$ 25 mg./kg. Solutions of 0.01% kill aphids and spider mites completely and solutions of 0.001% kill flies completely.

When using instead of β-methoxy vinyl phosphonic acid dichloride the equimolecular amount of β-methoxy vinyl thiophosphonic acid dichloride there is obtained the ester of the following formula

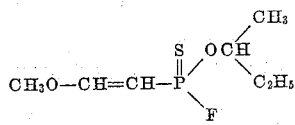

Example 5

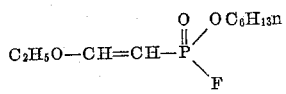

85 grams of sodium fluoride are suspended in 200 millilitres of toluene. Thereto are added 41 grams of n-hexyl alcohol. Then there are added dropwise at 80° C. 76 grams of β-ethoxy vinyl phosphonic acid dichloride. The temperature is kept for 1 further hour at 90° C. and the mixture is worked up in a usual manner. There are obtained 63 grams of the new fluorophosphonic acid ester of B.P. 0.01 mm./96° C. Yield: 65% of the theoretical. Toxicity on rats per osmium 50 mg./kg. $LD_{50}$. Solutions of 0.01% kill aphids and spider mites completely. Caterpillars are killed completely with 0.1% solution.

Example 6

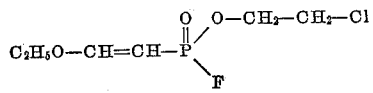

85 grams of sodium fluoride are suspended in 200 millilitres of toluene. Thereto are added 34 grams of ethylene chlorohydrine. Then there are added dropwise at 80° C. 76 grams of β-ethoxy vinyl phosphonic acid dichloride and the temperature is kept for 1 further hour at 90° C. After working up as usual there are obtained 60 grams of the new ester of B.P. 0.01 mm./87° C. Yield: 60% of the theoretical. Toxicity on rats per osmium $LD_{50}$ 25 mg./kg.

By the same way but using instead of ethylene chlorohydrine the equimolecular amount of propylene chlorohydrine there is obtained the ester of the following formula

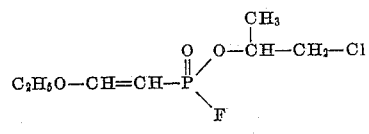

Example 7

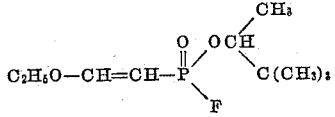

85 grams of sodium fluoride are suspended in 200 millilitres of toluene. Thereto are added 41 grams of pinacoline alcohol. Then there are added dropwise at 80° C. 76 grams of β-ethoxy vinyl phosphonic acid dichloride. The temperature is kept for 1 further hour at 90° C. and the mixture is worked up as usual. There are obtained 82 grams of the new ester. Yield: 86% of the theoretical. The ester is distillable under decomposition even in high vacuum. Toxicity on rats per osmium $LD_{95}$ 500 mg./kg.

We claim:

1. Phosphonic acid ester fluorides of the following general formula $$\underset{(S)}{R}O-CH=CH-\overset{(S)O}{\underset{P}{\|}}\underset{F}{\overset{OR_1}{<}}$$

wherein R stands for lower alkyl radicals up to 4 carbon atoms and $R_1$ stands for a member selected from the group consisting of alkyl radicals up to 6 carbon atoms and monochloro substitution products thereof.

2. The phosphonic acid ester fluoride of the following general formula $$C_2H_5O-CH=CH-\overset{O}{\underset{P}{\|}}\underset{F}{\overset{OC_2H_5}{<}}$$

3. The phosphonic acid ester fluoride of the following general formula $$C_2H_5O-CH=CH-\overset{O}{\underset{P}{\|}}\underset{F}{\overset{OC_3H_7i}{<}}$$

4. The phosphonic acid ester fluoride of the following general formula $$C_2H_5O-CH=CH-\overset{O}{\underset{P}{\|}}\underset{F}{\overset{OCH_3}{<}}$$

5. The phosphonic acid ester fluoride of the following general formula $$C_2H_5O-CH=CH-\overset{O}{\underset{P}{\|}}\underset{F}{\overset{OC_6H_{13}n}{<}}$$

6. The phosphonic acid ester fluoride of the following general formula $$C_2H_5O-CH=CH-\overset{S}{\underset{P}{\|}}\underset{F}{\overset{OC_2H_5}{<}}$$

7. The phosphonic acid ester fluoride of the following general formula $$C_2H_5S-CH=CH-\overset{S}{\underset{P}{\|}}\underset{F}{\overset{OC_3H_7i}{<}}$$

8. The phosphonic acid ester fluoride of the following general formula $$C_2H_5S-CH=CH-\overset{O}{\underset{P}{\|}}\underset{F}{\overset{OCH_3}{<}}$$

9. The phosphonic acid ester fluoride of the following general formula $$CH_3O-CH=CH-\overset{S}{\underset{P}{\|}}\underset{F}{\overset{O\overset{CH_3}{\underset{|}{CH}}}{\underset{C_2H_5}{<}}}$$

10. The phosphonic acid ester fluoride of the following general formula $$C_2H_5O-CH=CH-\overset{O}{\underset{P}{\|}}\underset{F}{\overset{O-\overset{CH_3}{\underset{|}{CH}}-CH_2-Cl}{<}}$$

11. A phosphonic acid fluoride of the following general formula $$RO-CH=CH-\overset{S}{\underset{P}{\|}}\underset{F}{\overset{OR_1}{<}}$$

where R stands for lower alkyl radicals up to 4 carbon atoms and $R_1$ stands for a member selected from the group consisting of alkyl radicals up to 6 carbon atoms and monochloro substitution products thereof.

12. A phosphonic acid fluoride of the following general formula $$RS-CH=CH-\overset{O}{\underset{P}{\|}}\underset{F}{\overset{OR_1}{<}}$$

wherein R stands for lower alkyl radicals up to 4 carbon atoms and $R_1$ stands for a member selected from the group consisting of alkyl radicals up to 6 carbon atoms and monochloro substitution products thereof.

13. A phosphonic acid fluoride of the following general formula $$RO-CH=CH-\overset{O}{\underset{P}{\|}}\underset{F}{\overset{OR_1}{<}}$$

wherein R stands for lower alkyl radicals up to 4 carbon atoms and $R_1$ stands for a member selected from the group consisting of alkyl radicals up to 6 carbon atoms and monochloro substitution products thereof.

14. A phosphonic acid fluoride of the following general formula $$RS-CH=CH-\overset{S}{\underset{P}{\|}}\underset{F}{\overset{OR_1}{<}}$$

wherein R stands for lower alkyl radicals up to 4 carbon atoms and $R_1$ stands for a member selected from the group consisting of alkyl radicals up to 6 carbon atoms and monochloro substitution products thereof.

No references cited.

UNITED STATES PATENT OFFICE
CERTIFICATION OF CORRECTION

Patent No. 2,962,517            November 29, 1960

Hans-Joachim Tuppack et al.

It is hereby certified that error appears in the above numbered patent requiring correction and that the said Letters Patent should read as corrected below.

Column 3, lines 3 to 6, the formula should appear as shown below instead of as in the patent:

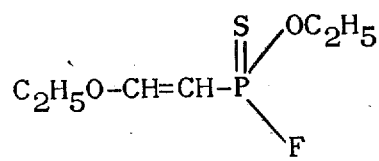

column 4, lines 34 and 51, and column 5, line 2, for "osmium", each occurrence, read -- os --.

Signed and sealed this 27th day of June 1961.

(SEAL)
Attest:

ERNEST W. SWIDER            DAVID L. LADD
Attesting Officer           Commissioner of Patents